Fig. 2

INVENTOR
JOHN HECOMOVICH

ATTORNEY.

Sept. 11, 1951 J. HECOMOVICH 2,567,668
APPARATUS FOR THE MEASUREMENT OF RADIOACTIVITY
Filed Oct. 21, 1946 7 Sheets-Sheet 7

INVENTOR
JOHN HECOMOVICH
BY
ATTORNEY.

Patented Sept. 11, 1951

2,567,668

UNITED STATES PATENT OFFICE 2,567,668

APPARATUS FOR THE MEASUREMENT OF RADIOACTIVITY

John Hecomovich, San Mateo, Calif., assignor to the United States of America as represented by the United States Atomic Energy Commission Application October 21, 1946, Serial No. 704,636

6 Claims. (Cl. 250—83.6)

This invention relates in general to apparatus for the measurement of radioactivity. More particularly, this invention relates to fission assay apparatus provided with an arrangement of safety devices to protect the operator from dangerous radiation and high voltage.

It is an object of this invention to provide radioactivity measuring apparatus adapted for fission assay and provided with an arrangement of safety devices which will protect the operator from dangerous radiation and from high voltage when using the invention.

Other and further objects will be apparent to those skilled in the art to which it relates from the following specification, claims and drawing.

Referring to the drawing briefly,

Figs. 3 and 3A illustrate a bank of four discriminator networks associated with the four ionization chambers of one lead house as employed in accordance with this invention;

Figure 1:
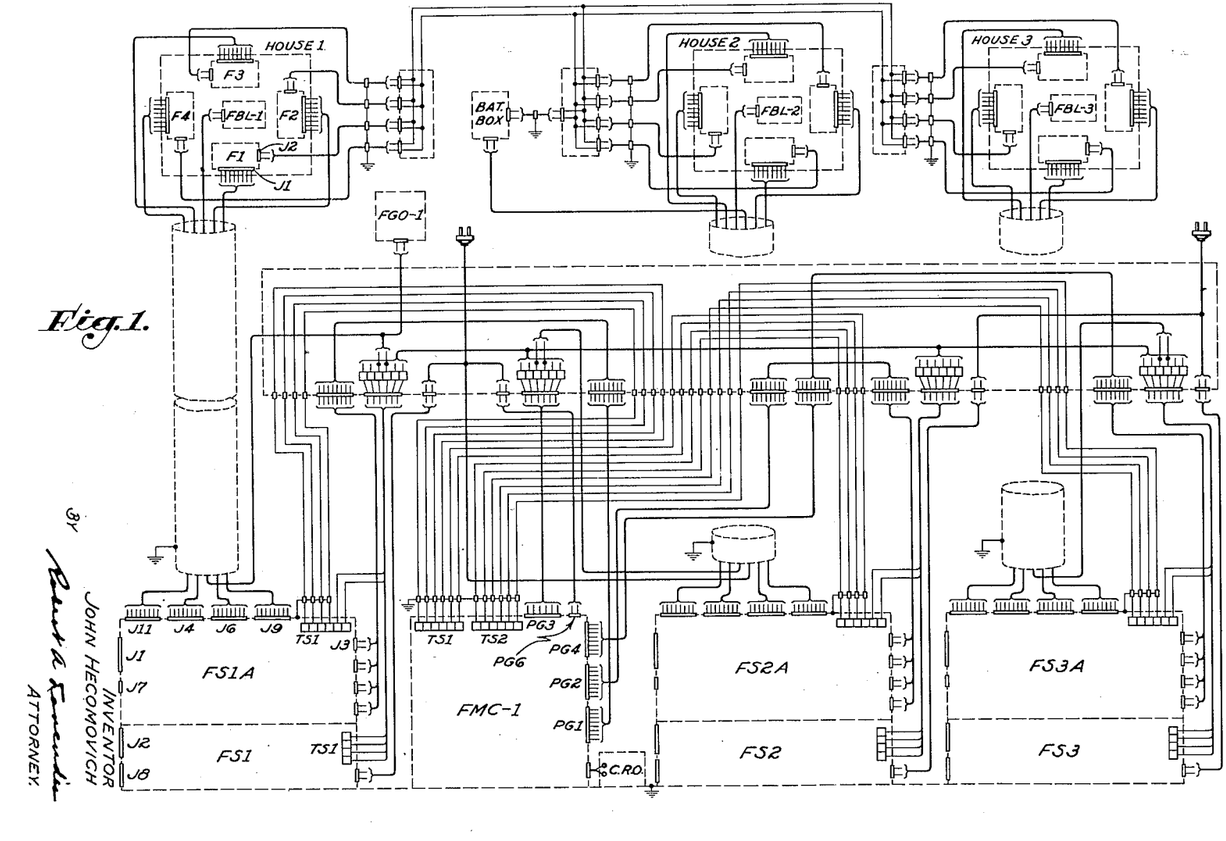
Figure 1 shows a general arrangement of the assay apparatus.

Referring to Fig. 1, there is illustrated a general arrangement of a fission assay apparatus constructed in accordance with the principles of the present invention. Considered broadly, this apparatus includes three lead houses, house 1, house 2, and house 3; three sets of discriminator networks, FS1A, FS2A and FS3A, and three power supplies, FS1, FS2 and FS3, associated with the respective lead houses; and a master control FMC—1. The three lead houses are arranged within a cage which may be entered only through a gate controlled by a gate operator FGO—1. The sets of discriminator networks FS1A, FS2A and FS3A, and the power supplies FS1, FS2 and FS3 and the master control FMC—1 are arranged on a common panel outside of said cage.

Each of these lead houses is of the general type described in the application of Emilio G. Segre, Serial No. 685,639, filed July 23, 1946, for Radioactive Assay Apparatus. Lead house 1, which is typical, comprises a lead floor and a lead roof and four vertical lead walls including four lead doors on which are respectively mounted four ionization chambers and associated amplifiers F1, F2, F3 and F4 of the type illustrated in Fig. 2. On the top of the roof there is arranged a lead dome communicating with the interior of the lead house. A source of fast neutrons, known as a bug, is arranged at the middle of each lead house and is arranged on a bug elevator FBL—1 at the middle of the lead house, the elevator being adapted to lower the bug into an operative position at the center of the lead house or to raise the bug into a safety position in the dome; the bug elevator illustrated in Fig. 7 being an alternative for the pulley arrangement shown in the above-noted Segre application. The lead house is substantially filled with paraffin or other hydrogenous substance, except for cavities therein arranged adjacent the four walls adapted to receive the assemblies of ionization chambers and associated amplifiers F1, F2, F3 and F4, and a central cavity into which the bug may be lowered. The output of each of the amplifiers is applied through one of the associated discriminator networks of Figs. 3 and 3A to a corresponding register (counter) on the master control panel illustrated in Fig. 5.

Figure 2:
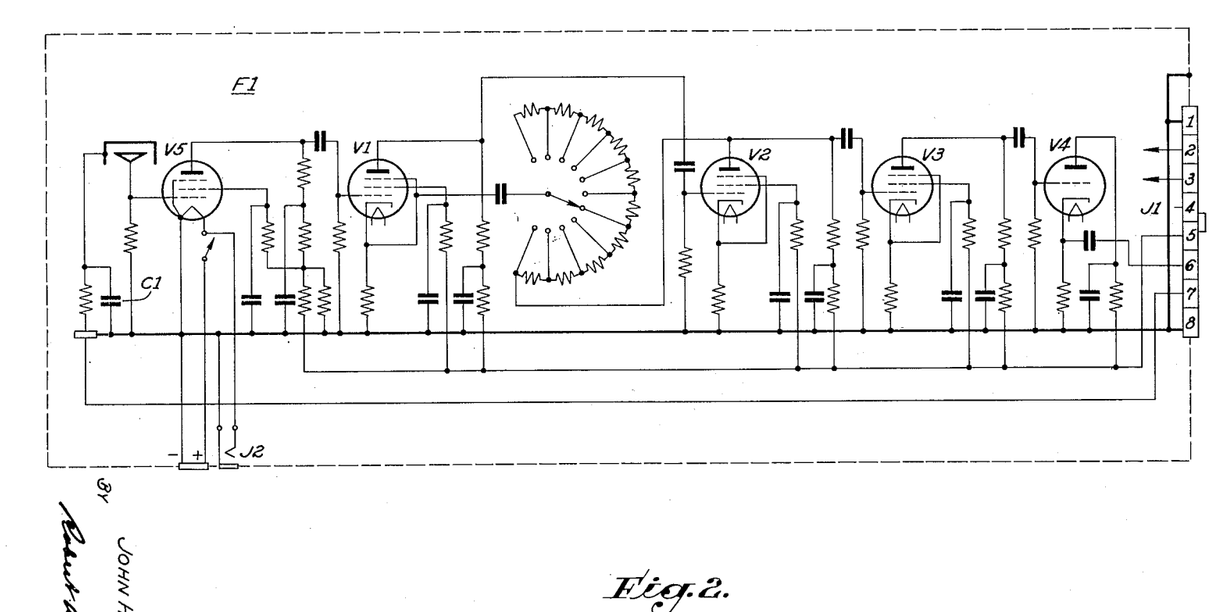
Fig. 2 shows a pulse amplifying circuit together with the associated ionization chamber employed in accordance with this invention.

Referring to Fig. 2, there is illustrated an ionization chamber together with an associated amplifier of the type mounted on each door of the lead houses. At the input of the amplifier there is illustrated an ionization chamber in which a sample to be analyzed is mounted. This ionization chamber comprises an electrode to which a high positive potential, for example +1000 volts, is applied through terminal 7 of jack J1 and another electrode which is connected directly to the control grid of the input tube V5. When an atom of the sample fissions as a result of absorption of a slow neutron, a positive pulse is applied to the grid V5, this pulse being amplified by the tubes V1, V2, V3 and V4 and appearing as a positive pulse at terminal 6 of jack J1. This positive pulse is then applied through terminal 6 of jack J4 of Fig. 3 to the associated discriminator network comprising the tubes V1, V2 and V3 of Fig. 3.

Figure 3:
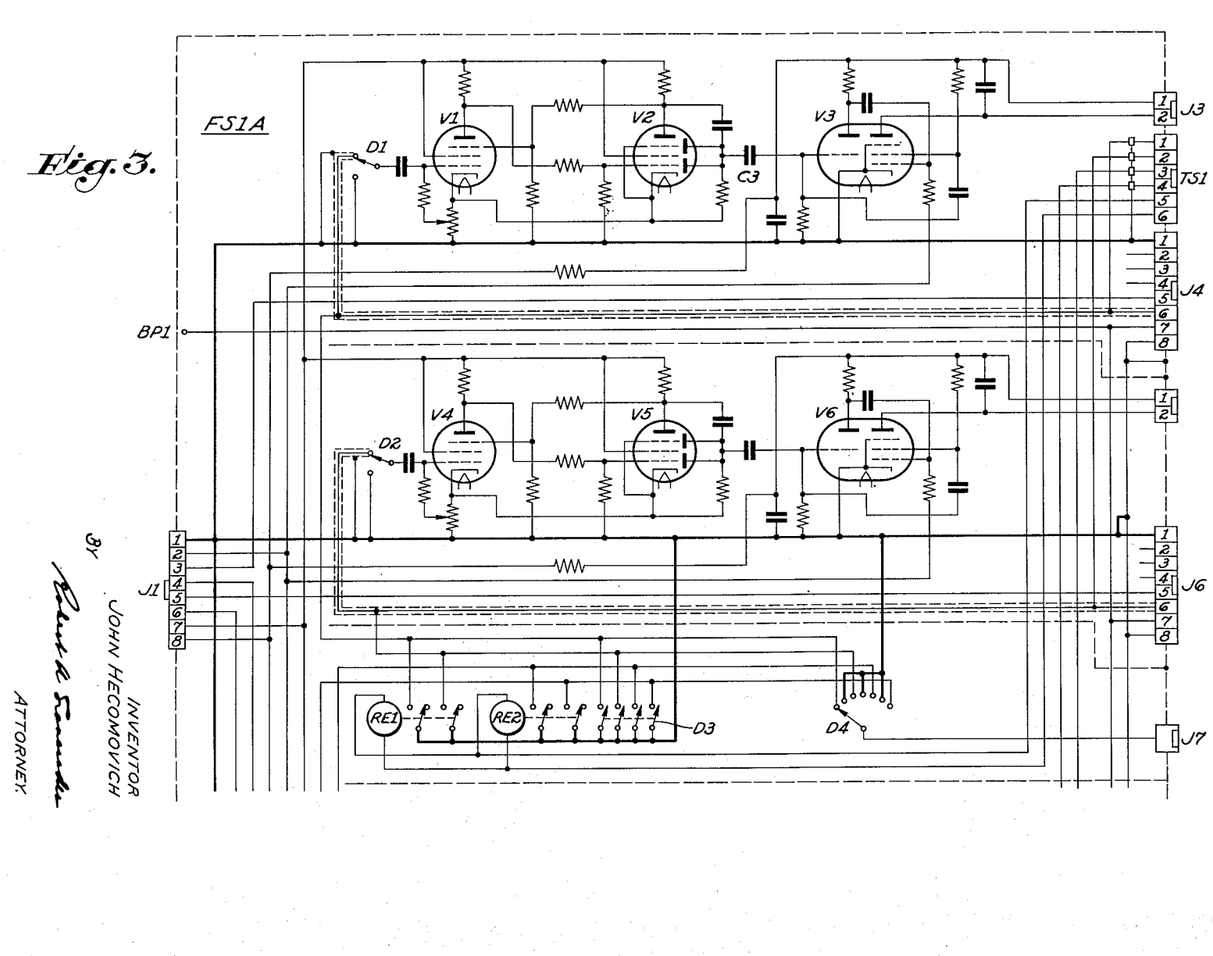

The tubes V1 and V2 of Fig. 3 comprise a discriminator circuit of the flip-flop type adapted to produce at its output a pulse of uniform size irrespective of the strength of the negative pulse applied to its input within a predetermined range. This negative pulse is applied through the coupling condenser C3 to the register drive circuit comprising tube V3, this circuit also being of the flip-flop type. Corresponding pulses are transmitted through the output jack J3 to the terminals 7 and 8 of jack PG1 of Fig. 5 and thence applied to the registers plugged in the associated jack J1. In a similar manner other ionization chambers arranged in the lead houses produce pulses which are impressed upon other registers on the control panel FMC—1.

At the respective inputs of the discriminator circuits shown in Figs. 3 and 3A, there are arranged individual manually operable shorting switches D1, D2, D5 and D6. In parallel with these individual shorting switches, respectively, there are also switch elements of a manually operable four pole shorting switch D3. When the switch D3 is open, pulses may be selectively applied from any ionization chamber to the corresponding register for any selected time interval by opening the corresponding individual shorting switches D1, D2, D5 and D6 for that time interval. If the switch D3 is initially closed and the individual switches D1, D2, D5 and D6 are moved to their upper positions, all of the corresponding registers may be operated simultaneously for the same time interval by opening the shorting switch D3 for that interval. Also connected across the inputs of these four discriminator circuits are normally open contacts of two timing relays RE1 and RE2, which may be energized for a selected time interval by applying energy thereto under the control of the Microflex timer of Fig. 5, as more fully described hereinbelow. The conductors connected across the windings of the timing relays RE1 and RE2 communicate through terminals 5 and 6 of terminal strip TS1 of Fig. 3 with terminals 1 and 2 of jack PG3 of Fig. 5.

Figure 5:
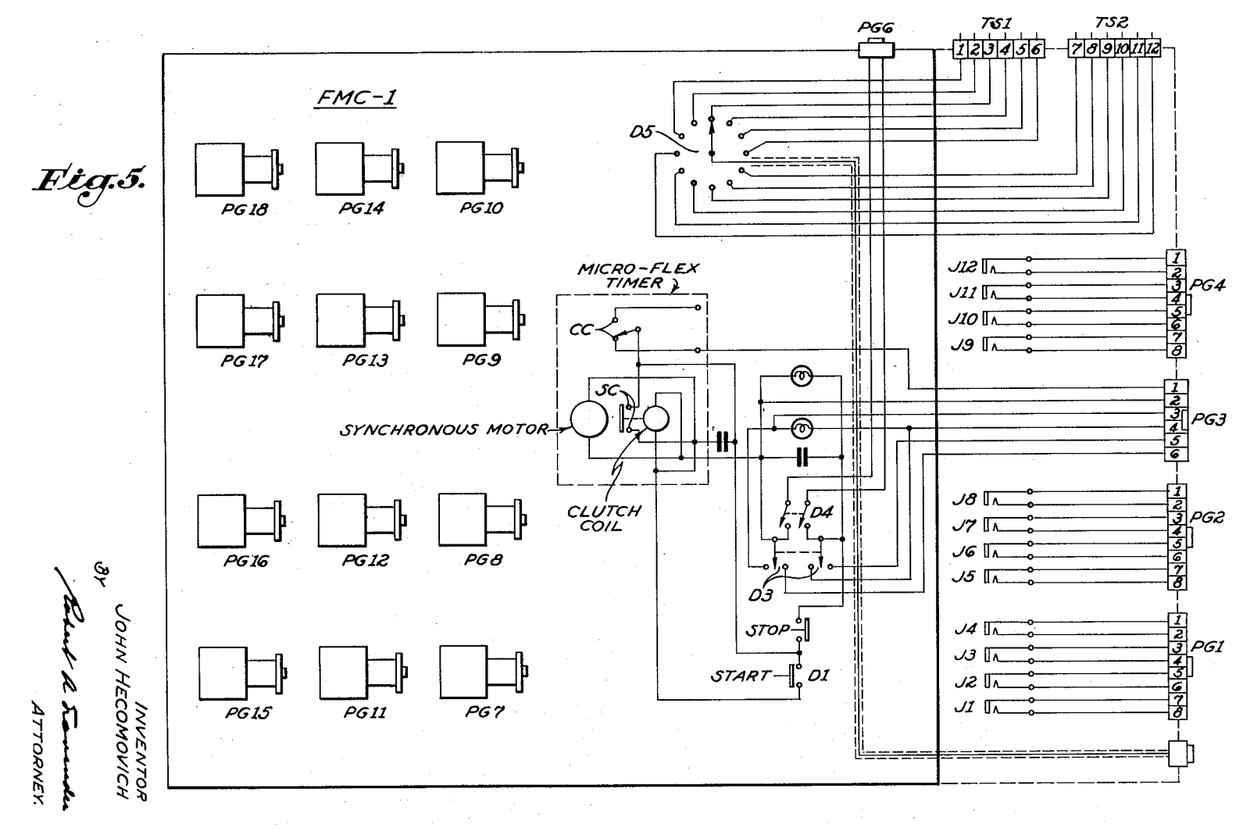
Fig. 5 illustrates a panel for the registers and master control of this invention.
Figure 5A:
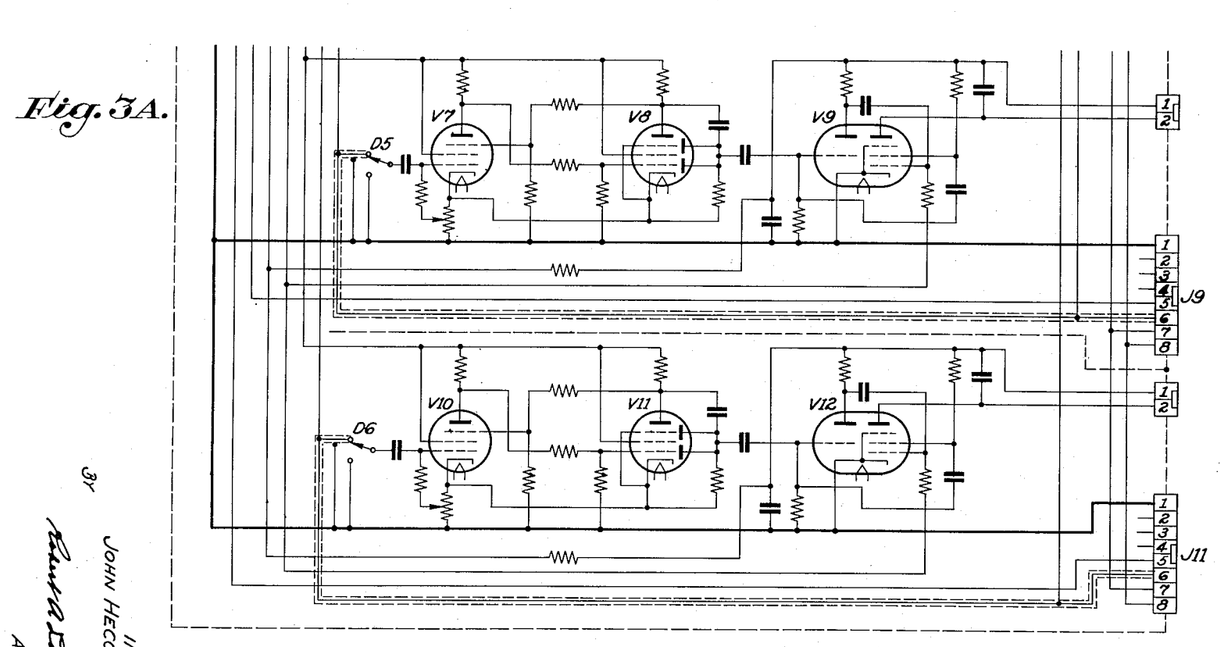

The output terminals of the amplifiers mounted on the four doors of house 1 communicate with corresponding terminals of the selector switch D5 of Fig. 5, through terminals 6 of jacks J4, J6, J9 and J11 of Figs. 3 and 3A, and terminals 1, 2, 3 and 4 of terminal strip TS1 of Fig. 3, to terminals 1, 2, 3 and 4 of terminal strip TS1 of Fig. 5. By means of selector switch D5, the output of any one of the pulse amplifiers arranged on the three lead houses may be selectively applied to the input of the cathode-ray oscilloscope C. R. O. of Fig. 1. Thus, the output of any one of the amplifiers may be examined to determine whether the noise level of the amplifier is large enough to render counting inaccurate or whether the pulse wave form is satisfactory. The cathode-ray oscilloscope may also be connected to the output of any amplifier in lead house 1 by connecting the oscilloscope to jack J7 of Fig. 3 and selectively connecting this jack to one of these amplifiers by means of the selector switch D4 of Fig. 3.

Figure 4:
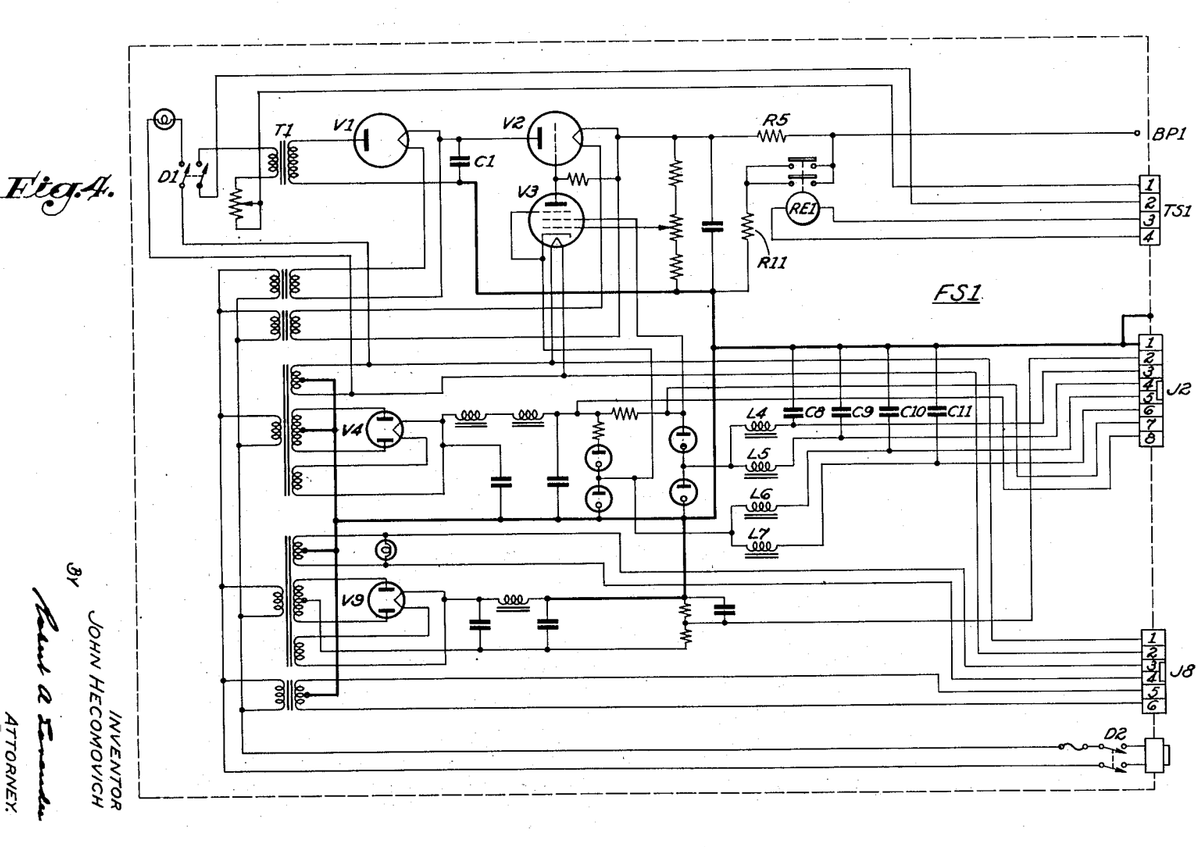
Fig. 4 is a schematic showing of the power supply.

Referring to Fig. 4, there is illustrated a power supply arranged to provide voltages to the various circuit elements illustrated in Figs. 2, 3 and 3A associated with lead house 1. This power supply includes a high voltage section and a low voltage section in addition to the filament supply. The low voltage section comprises a negative voltage supply comprising duo-diode V9 and a positive voltage supply including duo-diode V4 and associated networks. The high voltage section comprises a regulated voltage supply comprising diode V1, regulated series tube V2 and regulating shunt tube V3.

In one preferred embodiment of the invention, the negative voltage supply provides a bias of −72 volts to the signal grids of the pentode sections of the flip-flop circuits comprising tubes V3, V6, V9 and V12 of Figs. 3 and 3A which serve to drive the registers associated with lead house 1, this bias being supplied through terminal 2 of jack J2 of Fig. 4 to terminal 2 of jack J1 of Fig. 3.

The positive voltage power supply provides:

1. A voltage of +360 volts to the flip-flop circuits including tubes V3, V6, V9 and V12 of Figs. 3 and 3A, this voltage being applied to terminal 8 of jack J2 of Fig. 4 and terminal 8 of jack J1 of Fig. 3.

2. A voltage of +255 volts to the discriminator circuits comprising the pairs of tubes V1—V2, V4—V5, V7—V8 and V10—V11 of Figs. 3 and 3A, this voltage being applied through terminal 7 of jack J2 of Fig. 4 and terminal 7 of jack J1 of Fig. 3.

3. A voltage of +150 volts to the pulse amplifiers mounted on the four doors of house 1; the voltage applied to the amplifier of Fig. 2 of the network F1 associated with the first door, for example, being applied through terminal 3 of jack J2 of Fig. 4, terminal 3 of jack J1 of Fig. 3, terminal 5 of jack J4 of Fig. 3, and terminal 5 of jack J1 of Fig. 2.

Isolation networks including four low pass filters comprising inductances L4, L5, L6 and L7 and condensers C8, C9, C10 and C11 of Fig. 4, respectively associated therewith, are utilized between the low positive voltage supply and the four pulse amplifiers associated with lead house 1 to prevent pulses originating in the ionization chamber associated with any one of these amplifiers from being fed through the power supply to a counting network associated with another ionization chamber.

The high voltage supply provides a high positive potential of the order of +1000 volts to the ionization chambers mounted in a lead house 1, this voltage being supplied through binding post BP1 of Fig. 4, binding post BP1 of Fig. 3 and terminals 7 of jacks J4, J6, J9 and J11 of Figs. 3 and 3A to terminal 7 of jack J1 of Fig. 2 of the pulse amplifier and to corresponding terminals of related amplifiers in lead house 1. Power is supplied to the input transformer T1 of the high voltage supply through terminals 1 and 2 of terminal strip TS1 of Fig. 4 and terminals 3 and 4 of jack PG3 of Fig. 5, as more fully set forth hereinbelow. The voltage at the output of the high voltage supply may be reduced to a safe low value when desired by closing the normally open contacts of the relay RE1 by energizing the winding thereof, as more fully set forth hereinbelow. When these contacts are open, binding post BP1 is connected directly to the relatively high valued resistor R5; however, when these contacts are closed, the junction between binding post BP1 and resistor R5 is grounded through the relatively low valued resistor R11. The conductors connected across the winding of the high voltage protective relay RE1 communicate through terminals 3 and 4 of terminal strip TS1 of Fig. 4 with terminals 5 and 6 of jack PG3 of Fig. 5. It will be noted that the cathode and the screen of tube V3 of the high voltage supply are provided by the positive voltage supply of the low voltage section.

Figure 6:
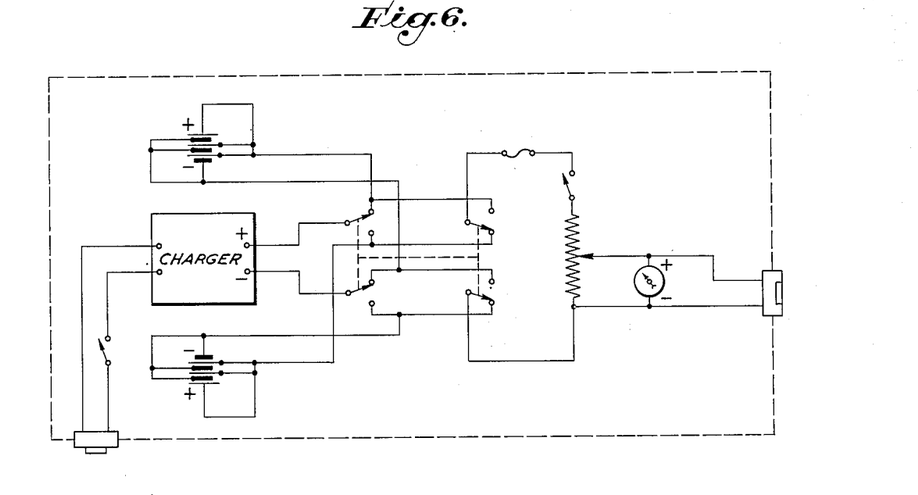
Fig. 6 is a view of the battery box.

Direct current voltage is supplied to the cathode of the input tube V5 of the pulse amplifier through jack J2 of Fig. 2, as are the input tubes of all of the amplifiers, from a common D. C. battery in the battery box of Fig. 6. The battery may be charged at will and thus eliminate the need of giving individual attention to batteries at the inputs of the various pulse amplifiers. It is important to supply the filaments of the input tubes with D. C. current in order to reduce hum that would otherwise be produced if A. C. current were utilized in this stage. The cathodes of the remaining vacuum tubes of the pulse amplifiers associated with lead house 1 and the tubes of the associated networks shown in Figs. 3 and 3A are supplied with alternating current from jack J8 of Fig. 4.

Referring to Fig. 5, there are shown details of the master control panel FMC—1. The master control panel FMC—1 includes three jacks PG1, PG2 and PG4 having numerous pairs of terminals to which the outputs of the register drives associated with the various ionization chambers of the lead houses are connected in the manner hereinabove described. These pairs of terminals lead to associated jacks J1, J2. . . , J12 into which any one of the plugs PG7, PG8. . . , PG18 associated with the registers may be plugged. The master control panel also comprises two terminal strips TS1 and TS2 communicating internally with the taps of selector switch D5 and externally with the outputs of the pulse amplifiers as hereinabove explained. The master control FMC—1 also comprises a Microflex timer and an associated control network.

Figure 7:
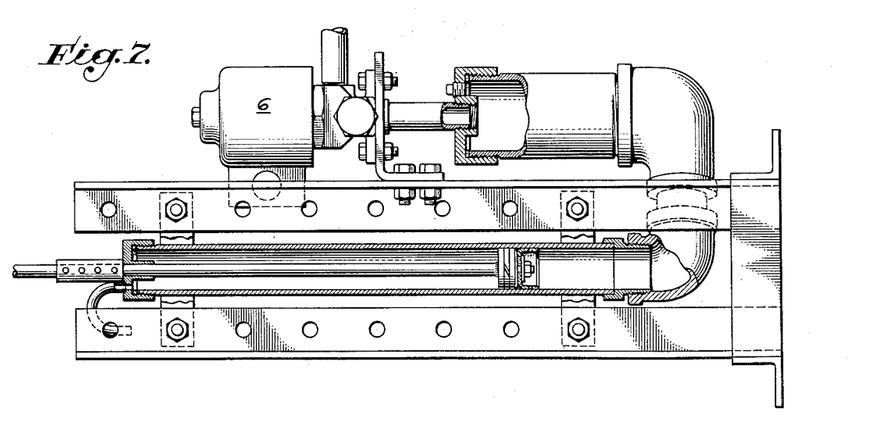
Fig. 7 is a view of the hydraulic bug elevator.

Power is supplied to the master control FMC—1 through the power connector PG6, the application of this power being under the control of the manually operable master switch D4. The output of this switch D4 may be selectively impressed upon various circuits as desired through the operate-safety switch D3; when the operate-safety switch D3 is pressed to the right into the safe position, power is supplied to terminals 5 and 6 of jack PG3 affecting the following controls:

1. The solenoid valve 6 of Fig. 7 is energized causing the bug to be lifted and withdrawn from the interior of the lead houses into the interior of the domes at the tops thereof and there retained.

2. Power is supplied to the winding of the high voltage protective relay RE1 of Fig. 4 discharging the condensers across the ionization condensers and reducing the voltage across the ionization chambers to a safe value.

3. Power is supplied to the gate operator FGO—1 releasing the gate and permitting entry therethrough into the cage within which the lead houses are arranged.

It will be noted that when the operate-safety switch is in the safe position, the cage may be entered without any danger to the operator being exposed to dangerous radiation from the bug when he opens any one of the doors. Likewise, the high voltage is removed from the ionization chamber so that he may change samples without danger of receiving a high voltage burn.

When the operate-safety switch D3 of Fig. 5 is moved to the left into the operate position, power is applied to terminals 3 and 4 of jack PG3 and thence to the input of the high voltage rectifier of Fig. 4, at the same time de-energizing the solenoid of the high voltage protective relay RE1, the solenoid of the gate operator FGO—1, and the solenoid of the bug elevators FBL—1, FBL—2 and FBL—3.

The Microflex timer includes a manually adjustable timing mechanism which may be selectively set to time the operation thereof by means of a master dial calibrated in minutes from 0 to 20 minutes and a vernier dial calibrated in seconds from 0 to 60 seconds. This timer includes a pair of control contacts CC, these contacts being normally closed and being included in a circuit in series with the windings of timing relays RE1 and RE2 of Fig. 3. In order to time a counting operation, the start switch D1 is momentarily depressed, thus completing the circuit through the clutch coil and the winding of the synchronous motor. When the clutch coil is operated, the normally open sticking contacts SC are closed, thus causing the clutch coil and the winding of the synchronous motor to remain energized when the start switch D1 is opened. Also, when the clutch coil is energized, the control contacts CC are opened, thus de-energizing the windings of the timing relays RE1 and RE2. Upon expiration of the predetermined time, previously manually set, the operation of the Microflex timer is timed out and a contact (not shown) in series with the clutch coil and the winding of the synchronous motor momentarily opened, causing the contacts SC and CC to be restored to their normal positions.

Considering now the standard procedure for operating the assay apparatus, the switch D4 is first closed and the operate-safe switch D3 is set in the safe position. Under these conditions, the solenoids of the bug elevators FBL—1, FBL—2 and FBL—3 are energized, thus causing the bugs in the three lead houses 1, 2 and 3 to be lifted into the lead domes at the tops of the respective lead houses and the gate to be released. With the bug thus elevated, the cage including the lead houses is entered, the doors of the lead houses opened and samples to be assayed introduced into the respective ionization chambers mounted on the doors. After the doors are returned to their closed position, the operator returns to the master control panel, and the power supplies, FS1, FS2, and FS3, one of which is illustrated in Fig. 4, are energized by closing switches D1 and D2 of Fig. 4, thus energizing the vacuum tubes in the various pulse amplifiers and the discriminator networks associated with the lead houses.

The operate-safe switch is then moved to the operate position, causing the solenoids of the bug elevators to be de-energized, thus permitting the bugs to descend into their operating positions in the interior of the lead houses and also the solenoid of the gate operator FGO—1 to be de-energized, thus locking the gate. Also, when the operate-safe switch is moved to the operating position, the high voltage section of the power supply is effectively connected to the ionization chambers causing a potential of a thousand volts to be applied across each of them. Simultaneously, however, the timing relays RE1 and RE2 are energized shorting out the inputs to the discriminator networks, thus rendering them inoperative for actuating the various counters.

Now with the various registers plugged to circuits connected in the outputs of the various discriminator networks and with the Microflex timer set to time a counting operation automatically, the start button D1 of Fig. 5 is depressed momentarily, thus initiating the operation of the Microflex timer, thereby opening the control contacts CC, thus de-energizing the timing relays RE1 and RE2, and thus operatively connecting each of the pulse amplifiers to a corresponding register. With the apparatus so operating, the respective registers are actuated each time the corresponding ionization chamber is rendered conductive due to the fission of an atom and the total number of such fissions which occur is accumulated on the respective registers. At the end of the time interval pre-set by the Microflex timer, the synchronous motor and clutch coil are de-energized and the control contact returned to its normally closed position, thereby causing the timing relays RE1 and RE2 to be energized again and thus to effectively disconnect the pulse amplifiers from the respective counters, thereby discontinuing the counting. The number of counts accumulated on the respective counters is used together with supplemental data in order to make an assay of the samples under investigation.

In order to analyze a second set of samples, the operate-safe switch is moved to its safe position, causing the bugs to be elevated into the respective domes and the gate to be released. Also, at this time the high voltage section of the power supply is effectively disconnected from the ionization chambers and the condensers C1 at the inputs of the pulse amplifiers are discharged to ground through the resistors R11 in the power supplies FS1, FS2 and FS3. With the apparatus thus rendered safe, the samples previously assayed may be withdrawn from the various ionization chambers and replaced by the new samples to be analyzed. The apparatus is then ready for use for assaying these samples in the manner hereinabove described.

From the foregoing description of the operation of the assay apparatus, it is seen that the operator is at all times protected from dangerous radiation emitted from the bugs and from high voltage.

While I have described the salient features of this invention in detail with respect to one embodiment, it will of course be apparent that numerous modifications may be made within the spirit and scope of this invention and I do not therefore desire to limit the invention to the exact details shown except in so far as they may be defined in the following claims.

What is claimed is:

1. Assay apparatus comprising a cage having a gate in one side thereof, a gate lock, a first relay operatively associated with said lock and having an operated and a safety position, said gate being locked when said first relay is in its safety position and unlocked when said first relay is in its operated position, a lead house arranged in said cage, said lead house having an opening in the wall thereof through which a sample may be transported and a lead cover for said opening, an auxiliary lead compartment with said lead house, a source of penetrating radiation, a movable element for moving said source between an operative position in said lead house and a safety position in said compartment, a second relay operatively associated with said movable element and having an operated and a safety position, said source being operatively disposed in said house when said second relay is in its operated position and being disposed in said compartment when said second relay is in its safety position, and a control device located externally of said cage and operatively associated with said relays for selectively moving either of said relays into its operated position and the other of said relays into its safety position.

2. Assay apparatus comprising a cage having a gate in one side thereof, a gate lock, a first relay operatively associated with said lock and having an operated and a safety position, said gate being locked when said first relay is in its safety position and unlocked when said first relay is in its operated position, a lead house arranged in said cage, said lead house having an opening in the wall thereof through which a fissionable sample may be transported to or from a test position in said house and a lead cover for said opening, an auxiliary lead compartment communicating with said lead house, a neutron source comprising a beryllium-radium mixture, a movable element for moving said source between an operative position in said lead house and a safety position in said compartment, said lead house containing a body of paraffin between said operative position of said source and said test position, a second relay operatively associated with said movable element and having an operated and a safety position, said source being operatively disposed in said house when said second relay is in its operated position and being disposed in said compartment when said second relay is in its safety position, and a control device located externally of said cage and operatively associated with said relays for selectively moving either of said relays into its operated position and the other of said relays into its safety position.

3. Assay apparatus comprising a cage having a gate in one side thereof, a gate lock, a first relay operatively associated with said lock and having an operated and a safety position, said gate being locked when said first relay is in its safety position and unlocked when said first relay is in its operated position, a house disposed within said cage and having an assay chamber and a communicating auxiliary chamber therein, an ionization chamber arranged in said cage within said assay chamber, said ionization chamber having a pair of plates between which a sample to be assayed may be mounted, a high-voltage source associated with said plates, a second relay operatively associated with said high-voltage source and having an operated and a safety position, said source being effectively connected across said plates when said second relay is in its operated position and being effectively disconnected from said plates when said second relay is in its safety position, elevator means operating between said assay chamber and said auxiliary chamber within said house and adapted to contain a radioactive sample, a third relay having an operated position and a safety position and connected to said elevator to control the disposition thereof, the operated position of said third relay energizing said elevator to maintain it in said assay chamber and the safety position of said relay energizing said elevator to maintain it in said auxiliary chamber, a power source connected to the coils of said relays, and a control device connected between said power source and said relays and having a first position maintaining said first relay in a safety position and said second and third relays in an operated position and a second position maintaining said first relay in an operated position and said second and third relays in a safety position whereby said gate is unlocked only when said ionization chamber is unenergized and said elevator is disposed in said auxiliary chamber.

4. In combination, an ionization chamber having a pair of plates between which a sample to be assayed may be mounted, a high-voltage power supply, a condenser connected across said pair of plates, means including a relatively high-valued resistor connecting said high-voltage source and said ionization chamber, and a shunting circuit including a relatively low-valued resistor and a switch connected in parallel with said condenser, whereby said condenser is quickly discharged and the voltage across said ionization chamber is quickly reduced when said switch is closed.

5. Assay apparatus comprising an ionization chamber, a source of penetrating radiation movable between an operative and a retracted position relative to said ionization chamber, first control means operative to move said source into said operative position from said retracted position, a pulse counter associated with said ionization chamber, second control means operative to disconnect said counter from said ionization chamber, means for selectively operating said first and second control means, and means including a timer cooperating with said second control means when operated for connecting said counter to said ionization chamber, for a predetermined time interval.

6. Assay apparatus comprising an ionization chamber, a source of penetrating radiation movable between an operative and a retracted position relative to said ionization chamber, a first relay operative to move said source into said retracted position when energized and into said operative position when de-energized, a pulse counter associated with said ionization chamber, a second relay adapted to effectively disconnect said counter from said ionization chamber when energized and to effectively connect said counter to said ionization chamber when de-energized, master control means for selectively energizing said first and second relays, and means including a timer for interrupting the energization of said second relay for a predetermined time interval.

JOHN HECOMOVICH.

REFERENCES CITED

The following references are of record in the file of this patent:

UNITED STATES PATENTS

| Number | Name | Date |
|---|---|---|
| 1,917,108 | Franke | July 4, 1933 |
| 2,090,517 | Moyer | Aug. 17, 1937 |
| 2,232,746 | Van Emden | Feb. 25, 1941 |